Aug. 31, 1926.

G. MARSHALL 1,597,919

AUTOMATIC SLIDE CHANGING DISPLAY LANTERN FOR ADVERTISING AND LIKE PURPOSES

Filed June 4, 1924    4 Sheets-Sheet 1

Inventor
G. Marshall
by Marks & Clerk
Attys

Aug. 31, 1926.
G. MARSHALL
1,597,919
AUTOMATIC SLIDE CHANGING DISPLAY LANTERN FOR ADVERTISING AND LIKE PURPOSES
Filed June 4, 1924      4 Sheets-Sheet 2
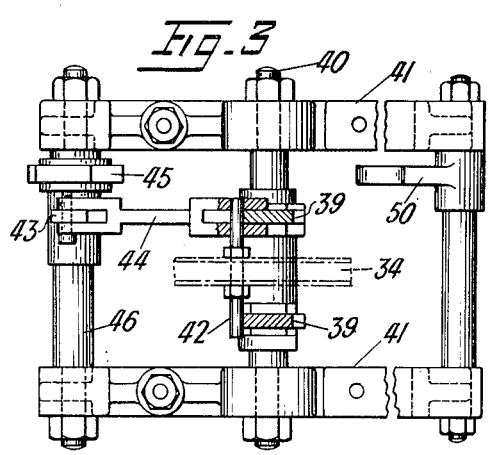
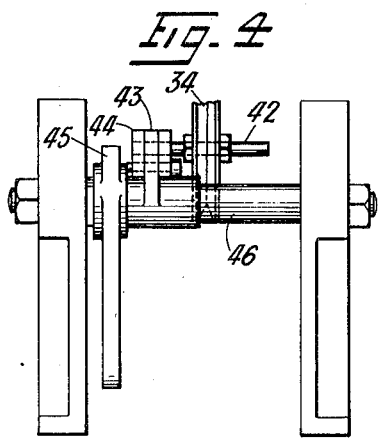
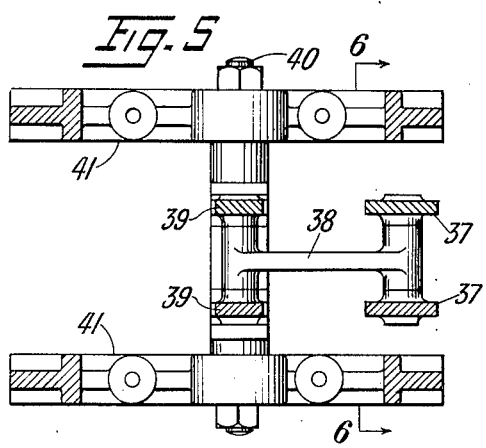
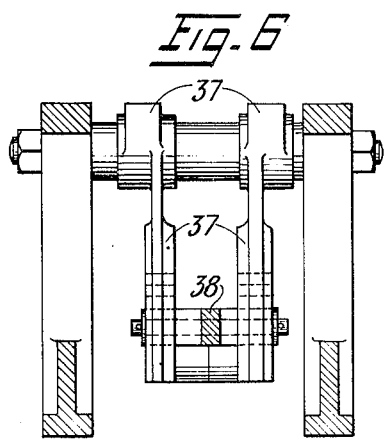
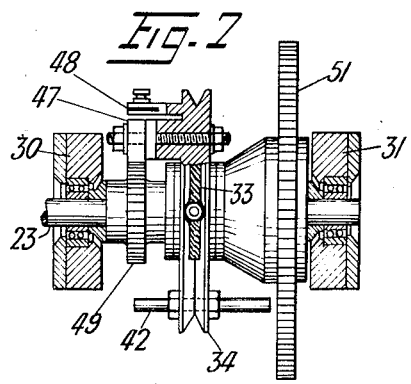
Inventor
G. Marshall
By Marks & Clerk

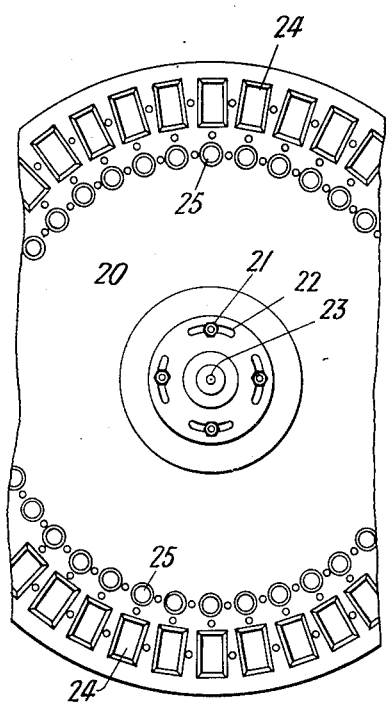
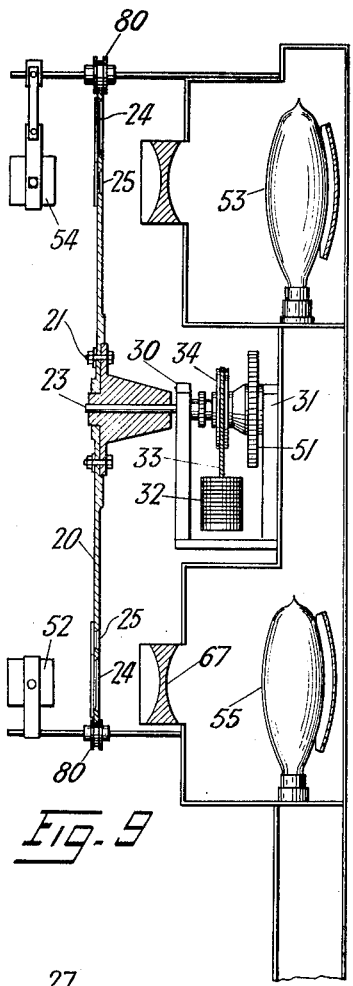
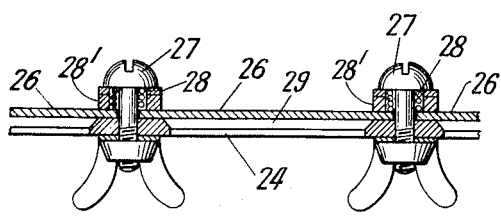

Aug. 31, 1926.

G. MARSHALL 1,597,919

AUTOMATIC SLIDE CHANGING DISPLAY LANTERN FOR ADVERTISING AND LIKE PURPOSES

Filed June 4, 1924     4 Sheets-Sheet 4

Inventor
G. Marshall
By Marks & Clark
Attys.

Patented Aug. 31, 1926.

1,597,919

UNITED STATES PATENT OFFICE.

GEORGE MARSHALL, OF SYDNEY, NEW SOUTH WALES, AUSTRALIA.

AUTOMATIC SLIDE CHANGING DISPLAY LANTERN FOR ADVERTISING AND LIKE PURPOSES.

Application filed June 4, 1924, Serial No. 717,874, and in Australia August 6, 1923.

This invention relates to lantern-type apparatus for displaying advertisements and/or pictorial and/or informative matter, and it consists in certain improved arrangements whereby a large number of changes in the matter displayed may be effected at timed intervals, the display exhibited on either one or several sides of a tower or column-like structure, and the changes effected so that at each change projections of different slides are exposed on translucent screens located in different positions.

In the accompanying drawings:—

Fig. 3 is a top plan view showing portion of the mechanism contained in Fig. 2.

Fig. 4 is an end elevation corresponding with Fig. 3;

Fig. 5 is a horizontal section on the line 5—5 Fig. 1;

Fig. 6 is a transverse section on the line 6—6 Fig. 5;

Fig. 7 is a sectional elevation of portion of the mechanism shown in Figs. 1 and 2;

Fig. 8 is an incomplete elevational view of the disc carrier in which the slides are mounted;

Fig. 9 is a transverse vertical section illustrating the illumination system and the relation thereto of the slide carrier and its operating mechanism;

Fig. 10 is an enlarged fragmentary section explanatory of the fastening device used for securing the transparency slides in the panel openings in the rotary carrier;

Figure 13:
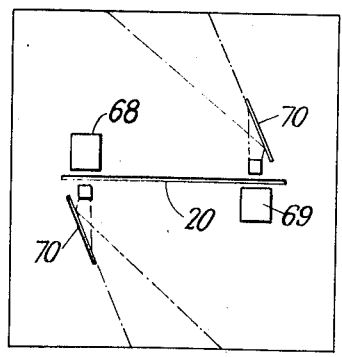
Figure 14:
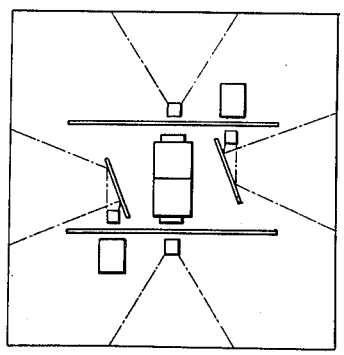

Fig. 13 is a diagrammatic plan view explanatory of another arrangement in which two or four projectors are used for throwing the images of two slides in the carrier on to two oppositely disposed screens respectively; and Fig. 14 is a diagrammatic plan view explanatory of another arrangement in which either four or eight projector lamps may be used for throwing either one or two sets of images on each one of the four screens forming the sides of an enclosing chamber in which the apparatus is contained.

It is to be understood that in the Fig. 13 arrangement four projector lamps may be used with a corresponding number of reflectors for the purpose of throwing two images on each of the two oppositely disposed screens forming parts of the wall of the enclosure in which the operative part of the mechanism is housed.

Figure 1:
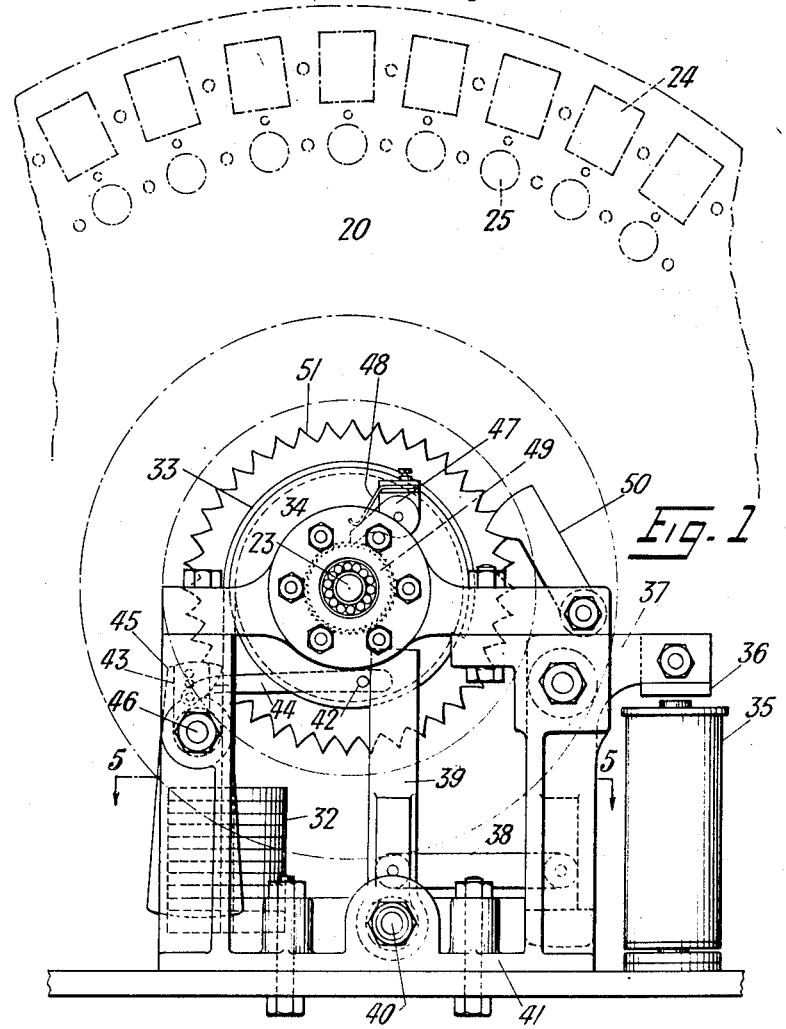
Fig. 1 is an elevational view of automatic step-by-step mechanism which is electro-mechanically operated under clock control to apply intermittent step-by-step timed motion to a disc carrier in which transparency slides are mounted.
Figure 2:
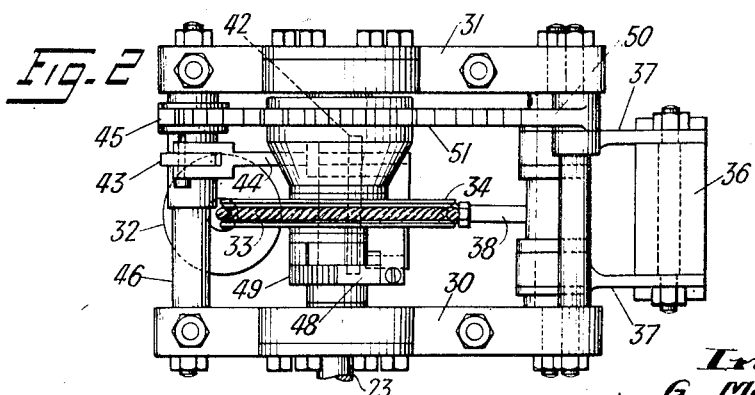
Fig. 2 is a top plan corresponding with Fig. 1.

The carrier (see Figs. 1, 8, and 9) consists of a metal disc 20 adjustably mounted by bolts 21 working in slotted holes 22 in a hub flange which is keyed on the intermittent drive spindle 23 and is guided peripherally to steady it by two or more shrouded idle wheels 80. The disc 20 is pierced with concentrically disposed groups of panel apertures in which respectively transparencies of the matter to be displayed are mounted. 24 is the outer group of these transparency apertures and 25 is the inner group in a carrier having only two groups of transparencies. As shown the apertures in the group 24 are rectangular and the apertures in the group 25 are circular, but the shape of the apertures may be modified according to the desire of the constructor.

The transparencies are fixed against the apertures 24 and 25 by wing bolts 27, provided with cushioning springs 28 within their washers. The disc 20 is recessed as shown at 29 about the several apertures. 26 shows the slide in position. The edges of the washers 28' overlap the edges of the transparencies 26 and clamp them in place as shown in Fig. 10. It is obvious that the transparencies also may be fixed against the said apertures by claw springs.

The spindle 23 is rotatably mounted in bearings in standards 30 and 31 between which the drive mechanism is accommodated. Intermittent rotational motion is applied to the spindle 23 subject to pawl release by means of a weight 32 suspended by a flexible cord 33 running over a grooved pulley 34, and by intermediate gearing.

The mechanism is operated by an electro-magnet (or a solenoid) 35, the circuit of which is automatically closed at pre-arranged time intervals to a contact driven from a clock train or is otherwise controlled to energize the magnet 35 at the required times. 36 is the magnet armature. It is fixed on the arms 37 of bell crank levers, the work arms of which are connected by a link 38 to oscillating arms 39 which are pivotally mounted at 40 in the base plates 41 of the mechanism.

In their left hand movement the arms 39 contact with an off-set pin 42 fixed in the grooved pulley 34 which is rotatable on the spindle assembly, and this pin 42 carries pivotally a link 44 which is articulated to an oscillatable arm 43 which is pivotally hung at 46 in the frame standards. The grooved pulley 34 also carries a check pawl 47 having a back spring 48 arranged to keep it engaged with a detent wheel 49 which is keyed to the spindle 23. 50 is a check pawl. The pawls 45 and 50 are engageable with the detent teeth 51 on a disc which is keyed to the spindle 23.

At each movement of the armature 36 the oscillating arms 39 are pushed against the offset pin 42. Thereby a rotational movement through a few degrees (one tooth space) is applied to the grooved pulley 34, and the pawl 47 is tripped back over the detents on the edge of the wheel 49. At the same time the link 44 acting through the arm 43 throws the pawl 45 clear, thus releasing the detent wheel 51. The weight 32 is thereupon ready to act to rotate the grooved pulley 34, and immediately the armature is released the offset pin 42 comes back to its normal position, due to the weight 32 pulling the pulley 34 over. The pawl 47 being engaged with the detents on wheel 49 pushes this wheel over, the whole movement being so timed that when the off-set pin 42 is back to normal position the carrier 21 has been moved just sufficient to bring the next aperture into position, and the pawl 45 back into the detent wheel. The pawl 50 acts only as a check against reverse movement, and thus ensures steady intermittent one way movement of the carrier.

In the right hand movement of the grooved pulley 34 the weight 32 is lifted. Upon the release of the armature 36 the grooved pulley 34 is free to turn reversely, and it is turned reversely as the weight 32 descends. The energy of the descending weight 32 is thus applied to effect intermittent rotation to the carrier 20, and at each partial rotation the weight 32 is again lifted by the operation of the electro-magnetic mechanism.

Either one or two carrier discs 20 may be fitted according to the desired arrangement of the display apparatus. In practice the display apparatus will be constructed as a clock column, but I do not limit myself to that scheme of arrangement. It might, for instance, consist of a simple column not exposing an illuminated clock face and the display may be arranged to be shown on either one, two, three, or all four sides of the column.

When an illuminated clock is fitted as part of the structure the electric circuit which serves the lamp which illuminates the clock is interrupted momentarily during the change-over of the display. This control may be effected by a switch connection to the armature 36 so arranged that the clock lamp circuit will be broken momentarily when the armature is pulled down. This arrangement is advantageous for advertising displays as the clock face may be inscribed with an advertisement to which attention is attracted by the alternate lighting and extinguishing of the clock lamp.

One disc serves for effecting a display on any two or any three sides of the structure. In the preferred arrangement an illuminated clock face showing one, two, three, or four sides is fitted in the upper part of the structure, and the clock mechanism is utilized to control a local battery circuit to operate the electric magnet 35. Below the clock face a display aperture glazed with matt surface glass is fitted, and in a lower part of the apparatus another aperture similarly glazed. When a multiple side arrangement is used two similarly disposed glazed display apertures are fitted in the several sides of the structure on which the display is required to be effected.

The transparencies set in the group of apertures 24 are placed in erect position and those in the apertures in the group 25 in reverse position, or vice versa, according to the projector arrangement as will be hereinafter described, this reversal being necessary in view of the fact that the images of one set of transparencies are projected when the transparency is at top position on the disc 20 and the other when the transparency is at bottom position on the disc 20. This will be understood on reference to Fig. 9 where the projector lamp 53 is arranged to throw a beam in alignment with the transparencies 25, 54 being a lens cell in which the beam is focused to throw a clear image of the transparency on the glass display screen in the side of the structure, whilst the lamp 55 and its lenses 52 and 67 are centered to direct the beam through the transparencies in the group 24. Erect images are thus displayed on the screens.

Figure 11:
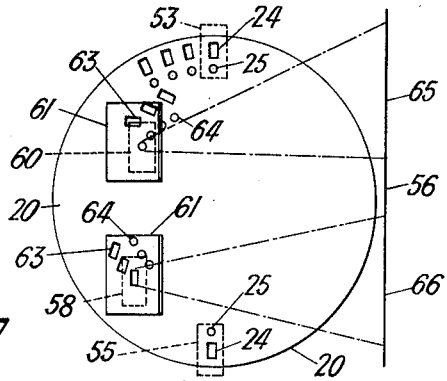
Fig. 11 is a diagrammatic elevational view corresponding with the plan view Fig. 12, these views being explanatory of an arrangement in which four projector lamps are used with one carrier and a system of reflectors arranged for throwing the projected images on to two screens in angular relation to each other.
Figure 12:
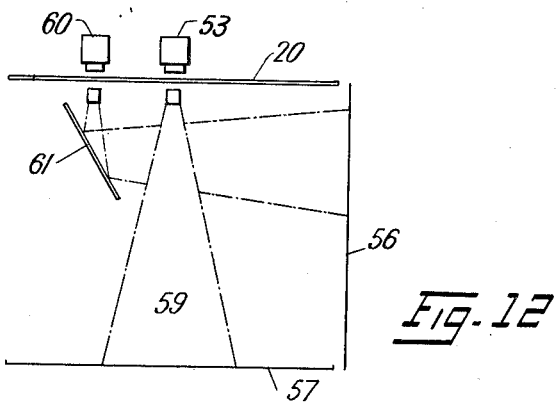

In the arrangement shown in Figs. 11 and 12, one carrier disc 20 is used with two or four projector lamps to throw on to each of the screens 56 and 57 respectively either one or two images. In this case two lamps 53 and 55, one above the other, respectively throw beams 59 on to the screen 57, one of them through the transparencies in one group 24, and the other through the transparencies in the other group 25 on the carrier 20. Similarly the two lamps 60 and 58 arranged one above the other throw their beams against reflectors 61 by which the beams are deflected laterally and thrown on to the screen 56. It is to be understood that one lamp 53 and one lamp 60 or two lamps 53 and 58 one above the other or two lamps 60 and 58 one above the other may be used according to the display desired.

It will be observed that Fig. 11 shows the transparency carrier fitted with a third range of apertures which are disposed tangentially, together with an accompanying range of circular apertures. These two inner ranges of apertures marked respectively 63 and 64 carry transparencies through which beams are thrown from the lamp or lamps 58 or 60, which lamps are disposed laterally of the vertical centre of the carrier disc 20. The necessity for this disposition of the lamps 58 and 60 will be at once apparent on consideration of the diagram Figures 11 and 12. As shown in Fig. 11, the display projection from one of the transparencies in the group 64 is displayed at 65 on a glass screen in one side of the structure, whilst the display projected from one of the transparencies in the group 63 is displayed at 66 on the same side of the structure. At the same time displays are projected from transparencies in the group 25 by the upper lamp 53 and from the group 24 by the lower lamp 55. Thus simultaneously four different displays are thrown on the screens in the particular arrangement indicated in Fig. 11, two displays appearing one above the other on screens at one side of the structure and two displays appearing one above the other on another side of the structure contiguous to the first mentioned side of it. Any one or more of these displays may be cut out, each of them being a different one. The attention of onlookers is attracted particularly by the fact that two changes in the displays on any aspect of the structure are effected simultaneously and that a repetition of the same pair of displays does not occur for a relatively long time. Attention is further attracted when the electro-magnetic control is so arranged that the change takes place at half-minute intervals or at one minute intervals, onlookers becoming interested in observing the movement of the hands of the clock on the illuminated dial and watching for the timed changes in the displays at other places on the structure. The diagrammatic arrangement shown in Fig. 13 discloses a means whereby displays may be shown on two opposite sides of the structure, a single carrier disc only being used. By appropriately arranging the angular position of the rectangular apertures 24 or 63 in the carrier, two lamps one above the other, may be used in the position 68, and two lamps, one above the other, in the position 69, in which case two displays will be presented simultaneously one above the other on opposite sides of the structure. 70 are reflectors by which the beams are deflected on to the display screens.

The diagrammatic arrangement shown in Fig. 14 provides for an equipment of two carrier discs with the lamps and reflectors arranged for the projection of display views on screens in all four sides of the structure. Here again by appropriately setting the angular positions of the rectangular apertures in the carriers, eight or more views may be presented grouped one above the other on several sides of the structure.

What I claim as my invention and desire to secure by Letters Patent is:—

1. A lantern projector display apparatus including an automatically operating and intermittently rotating carrier disc having circular groups of transparency apertures therethrough in concentric arrangement, a projector lamp for each group, and means for rotating said carrier disc, said means comprising a detent keyed to a spindle, a grooved driving pulley rotatable about said spindle, a spring pawl mounted on said pulley and engageable with said detent, a detent toothed disc fixed on said spindle, two check pawls engageable with said detent toothed disc, an offset pin mounted in said pulley and link-connected to one of said check pawls, a striker-lever coacting with said offset pin and electro-mechanical means for actuating said striker and for moving said check pawl.

2. A lantern projector display apparatus as claimed in claim 1, including a second intermittently rotating carrier disc having circular groups of transparency apertures therethrough in concentric arrangement, and a projector lamp for each of the last mentioned groups, a plurality of screens positioned in angular relation to the plane of the second carrier disc and forming part of the lantern structure, and reflectors disposed to project images of a plurality of transparencies on to said screens simultaneously.

In testimony whereof I have signed my name to this specification.

GEORGE MARSHALL.